US011460867B2

(12) United States Patent
Liu

(10) Patent No.: US 11,460,867 B2
(45) Date of Patent: Oct. 4, 2022

(54) SYSTEM OF MULTI-SWARM DRONE CAPTURING

(71) Applicant: Sony Group Corporation, Tokyo (JP)

(72) Inventor: Cheng-Yi Liu, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 297 days.

(21) Appl. No.: 16/917,024

(22) Filed: Jun. 30, 2020

(65) Prior Publication Data
US 2021/0405661 A1 Dec. 30, 2021

(51) Int. Cl.
*G05D 1/00* (2006.01)
*G05D 1/12* (2006.01)
*G06T 7/00* (2017.01)
*B64C 39/02* (2006.01)
*G08G 5/00* (2006.01)
(Continued)

(52) U.S. Cl.
CPC ............. *G05D 1/12* (2013.01); *B64C 39/024* (2013.01); *G05D 1/0094* (2013.01); *G05D 1/104* (2013.01); *G06F 3/012* (2013.01); *G06F 3/013* (2013.01); *G06T 7/74* (2017.01); *G08G 5/0013* (2013.01); *B64C 2201/127* (2013.01); *G06T 2207/30201* (2013.01)

(58) Field of Classification Search
CPC ........ G05D 1/12; G05D 1/0094; G05D 1/104; G05D 1/00; B64C 39/024; B64C 2201/127; B64C 2201/143; B64C 39/02; G06F 3/012; G06F 3/013; G06T 7/74; G06T 2207/30201; G06T 7/246; G06T 2207/10016; G06T 2207/20081; G06T 2207/20084; G06T 2207/30196; G06T 7/00; G08G 5/0013; G08G 5/00;
(Continued)

(56) References Cited

U.S. PATENT DOCUMENTS 11,017,610 B2 * 5/2021 Nerurkar ................. G06T 19/20
2011/0212717 A1 * 9/2011 Rhoads .................. G06V 10/17
455/418
(Continued)

OTHER PUBLICATIONS

"Human Gaze-Driven Spatial Tasking of an Autonomous MAV"; Liangzhe Yuan et al. IEEE Robotics and Automation Letters (vol. 4, Issue: 2, Apr. 2019); pp. 1343-1350; Date of Publication: Jan. 25, 2019.
(Continued)

*Primary Examiner* — Yonel Beaulieu
(74) *Attorney, Agent, or Firm* — Trellis IP Law Group, PC

(57) ABSTRACT

A system of multi-view imaging of an environment through which a target moves includes pluralities of drones, each drone having a drone camera. A first plurality of drones moves to track target movement, capturing a corresponding first plurality of images of the target's face, making real time determinations of the target's head pose and gaze from the captured images and transmitting the determinations to a second plurality of drones. The second plurality of drones moves to track target movement of the target, with drone camera poses determined at least in part by the head pose and gaze determinations received from the first plurality of drones, in order to capture a second plurality of images of portions of the environment in front of the target. Post-processing of the second plurality of images allows generation of a first-person view representative of a view of the environment seen by the target.

20 Claims, 5 Drawing Sheets

(51) Int. Cl.
*G06F 3/00* (2006.01)
*G05D 1/10* (2006.01)
*G06F 3/01* (2006.01)
*G06T 7/73* (2017.01)

(58) Field of Classification Search
CPC ......... H04N 5/232061; H04N 5/23219; H04N 5/23299; H04N 5/247
See application file for complete search history.

(56) References Cited

U.S. PATENT DOCUMENTS

| | | | |
|---|---|---|---|
| 2014/0080428 A1* | 3/2014 | Rhoads | G06F 16/5838 |
| | | | 455/88 |
| 2015/0339527 A1* | 11/2015 | Plummer | G06V 40/18 |
| | | | 348/78 |
| 2016/0026253 A1* | 1/2016 | Bradski | H04N 13/128 |
| | | | 345/8 |
| 2019/0094981 A1* | 3/2019 | Bradski | G06F 3/017 |
| 2019/0174149 A1 | 6/2019 | Zhang et al. | |
| 2021/0004589 A1* | 1/2021 | Turkelson | G06T 5/00 |

OTHER PUBLICATIONS

DJI Digital FPV System; https://www.dji.com/fpv.
"First-Person Vision"; Takeo Kanade et al; Proceedings of the IEEE (vol. 100 , Issue: 8 , Aug. 2012) pp. 2442-2453; Date of Publication: Jul. 5, 2012.

\* cited by examiner

Figure 2
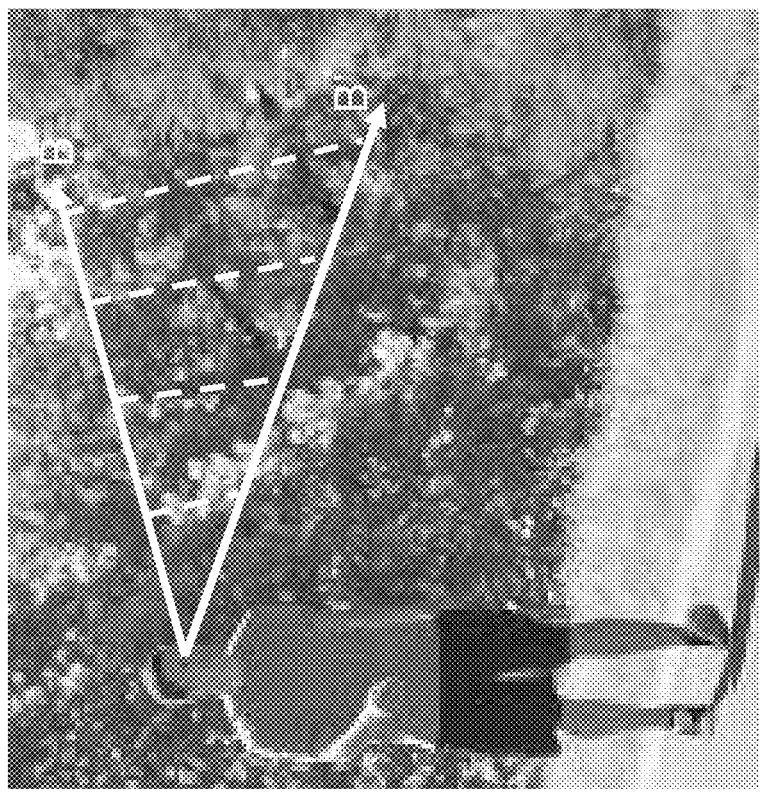
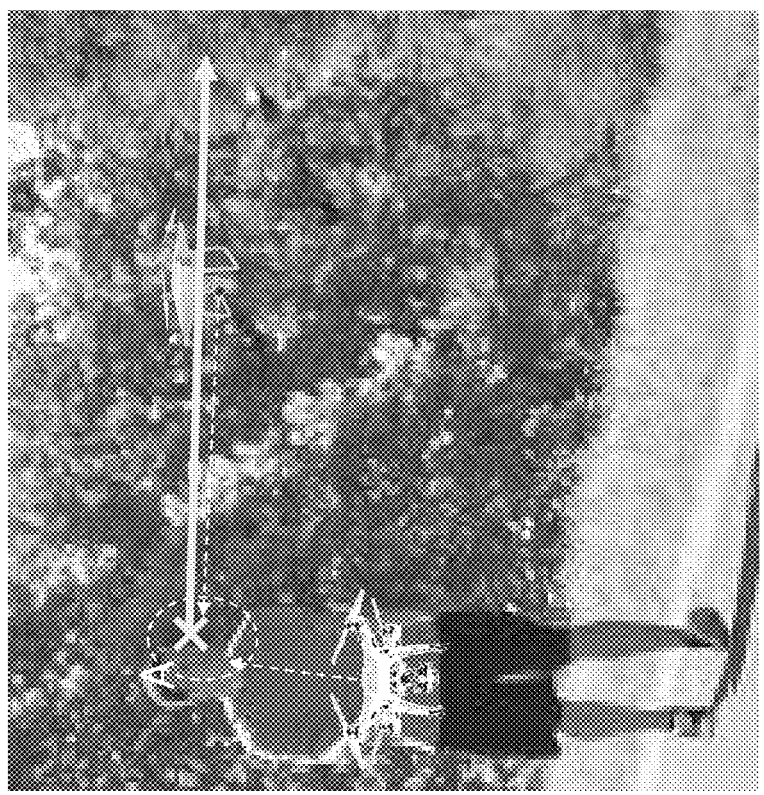

SYSTEM OF MULTI-SWARM DRONE CAPTURING

BACKGROUND

Conventional multi-view cinematography uses multiple fixed, well calibrated cameras to move according to a predetermined action script, capturing images while following a target or targets of interest within a limited space. Usually it is practical to do this only for a few important shots within a whole movie, where special visual effects, particularly first-person views, are particularly desirable. Such views may be useful in providing realistic, immersive experiences for the intended audience. Current approaches are unrealistic if one wants to capture the whole movie in a multi-view fashion. It is even more challenging if the portions of the movie where multi-view is desired comprise outdoor scenes or fast movement over a large space.

For capturing first-person view videos, in particular, the current state of the art requires the corresponding actor to install or wear cameras around their head close their eyes, and the cameras needs to be precisely aligned with the front plane of the actor's face. This puts serious capturing restrictions in place, because (a) the actions the actor is then able to perform may be significantly spatially restricted by the volume and weight of the cameras and the devices attaching them to the actor; (b) either careful control of the orientations of the field of view of the cameras, or very complex post-processing of the captured images is required to avoid or remove the cameras and devices from being visible in the final images; and (c) the "naturalness" of the actor's performance is likely to be affected by the sensation and consciousness of the extra material on their head.

There is therefore a need for better, preferably automated, systems of positioning and controlling multiple cameras so that they can track a target of interest without requiring any of: (1) physical contact with the target; (2) prior knowledge of the target movement; or (3) a master controller employed during the filming to track and control the spatial distribution and trajectories of all the individual cameras. Ideally, the systems would not need computationally intensive scene analysis or object recognition, especially during times of filming, and could easily switch between different targets during the filming. The use of drones and drone control systems currently available would at most address requirement (1).

SUMMARY

Embodiments relate to system and methods for multi-view imaging of an environment through which a target, which may be human or animal, moves.

In one embodiment, a system comprises a first plurality of drones, each drone having a drone camera; and a second plurality of drones, each drone having a drone camera. The first plurality of drones moves to track movement of the target, being positioned in front of the target such that: a corresponding first plurality of images of the person's face is captured by drone cameras of the first plurality of drones. The first plurality of drones makes real time determinations of the target's head pose and gaze, based on the first plurality of captured images and on spatial relationships between poses of the first plurality of drone cameras; and transmits the head pose and gaze determinations to the second plurality of drones. The second plurality of drones moves to track movement of the target, being positioned in proximity to the target, with drone camera poses determined at least in part by the head pose and gaze determinations received from the first plurality of drones, such that the drone cameras of the second plurality of drones capture a second plurality of images of portions of the environment in front of the target. Post processing of the second plurality of images allows generation of a first-person view representative of a view of the environment seen by the target at a time corresponding to the capture of the first plurality of images.

In another embodiment, a method comprises: operating a first plurality of drone cameras on a first plurality of drones to capture a first plurality of images of the target, the drones moving to track movement of the target while being positioned in front of the target such that the first plurality of images includes images of the target's face; making real time determinations of the target's head pose and gaze, based on the first plurality of captured images and on spatial relationships between poses of the first plurality of drone cameras; transmitting the head pose and gaze determinations from the first plurality of drones to a second plurality of drones positioned in proximity to the target, each drone having a drone camera; adjusting poses of the second plurality of drones to respond to the transmitted head pose and gaze determination as necessary to track target movement; adjusting poses of drone cameras on the second plurality of drones and operating the drone cameras of the second plurality of drones to capture a second plurality of images of portions of the environment in front of the target; and post-processing the second plurality of images to generate a first-person view representative of a view of the environment seen by the target at a time corresponding to the capture of the first plurality of images.

A further understanding of the nature and the advantages of particular embodiments disclosed herein may be realized by reference of the remaining portions of the specification and the attached drawings.

BRIEF DESCRIPTION OF THE DRAWINGS

FIG. 2 illustrates an arrangement for gaze determination according to some embodiments.

DETAILED DESCRIPTION OF EMBODIMENTS

For the purposes of this disclosure, pose is defined as a 6-dimensional parameter made up of 3-dimensional position and 3-dimensional orientation. In most cases, the discussion of the specific embodiments described in detail assumes, for simplicity, that the pose of a given drone fully determines the pose of the corresponding drone camera, although it should be understood that the present invention could be implemented in more complex cases, where drone cameras can be oriented to some degree independently of the orientation of the drones. Well known controllable motion devices (such as gimbals) may be installed on the drones for such cases, receiving commands either directly from a remote controller or indirectly from the drone, and providing trackable, calibrated responses.

Figure 1:
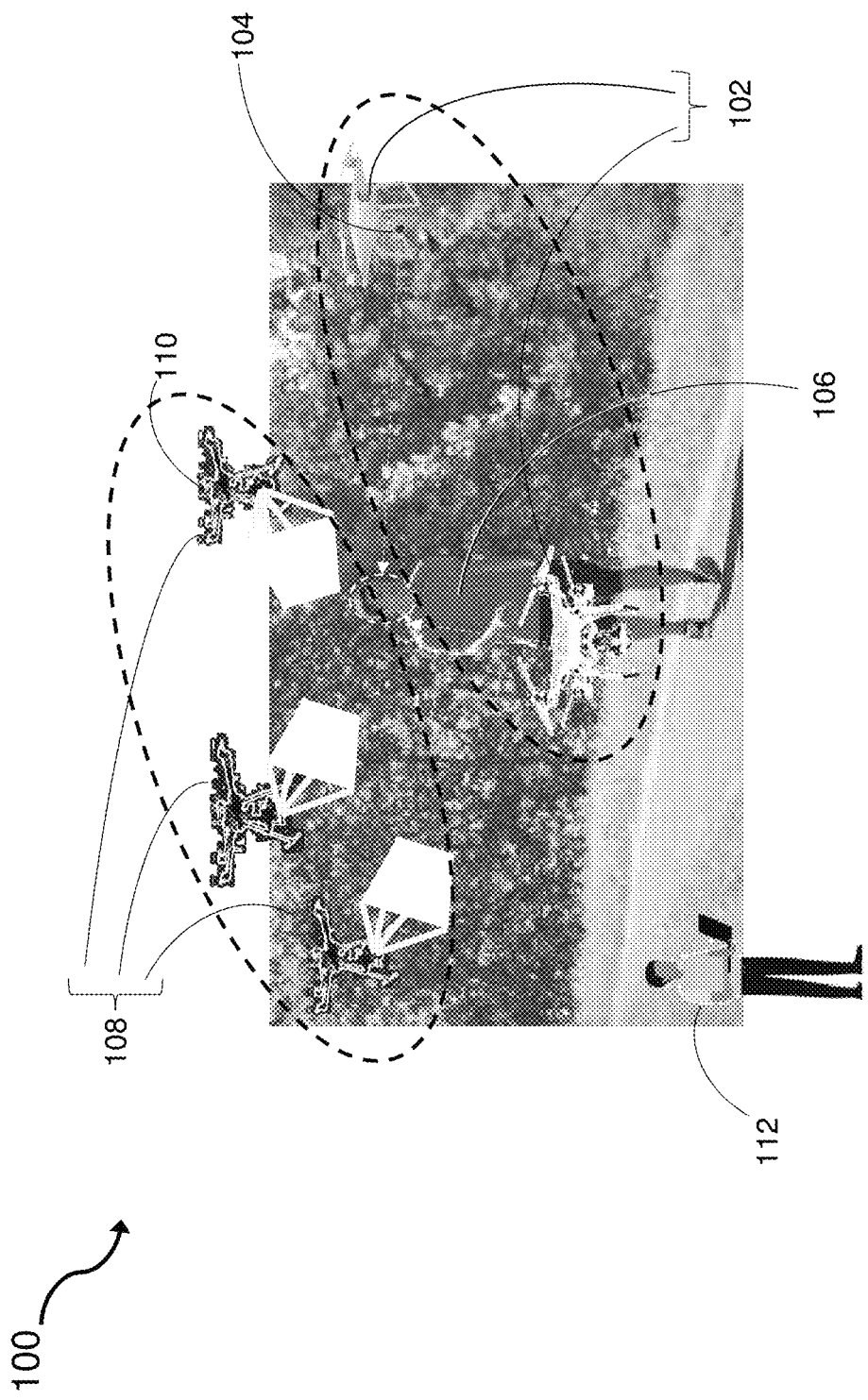
FIG. 1 illustrates an overview of a system for imaging a scene according to some embodiments.

FIG. 1 illustrates a system 100 for multi-view imaging of an environment according to some embodiments. System 100 includes a first plurality of drones 102 (just two are shown, for simplicity, but there may be many more), each drone 102 being equipped with a drone camera 104 (just one is indicated, for simplicity). Each drone 102 in the first plurality moves along its own trajectory to track movement of a target 106, shown here as a person, although, as noted above, the target may be an animal of another species. The drones 102 are positioned in front of the target, in this case the person, in relation to the direction the person is facing, with their cameras 104 oriented to be able to capture a first plurality of images of the person's face. Any one of various well-known image processing techniques may be used on the captured images, in combination with data on the spatial distribution of the drones, to allow real time determinations of the person's head pose, which may be taken as indicative of intended movement direction, and gaze (a 3-dimensional direction parameter) to be made, either within drones 102 or at a camera control station if the communication bandwidth is sufficient. These determinations are used to guide subsequent movements and orientations of the drones 102 so that these drones may maintain positions ahead of the person and their cameras 104 can adjust their orientations as necessary to capture images of the person's face even if the person changes direction, slows down or speeds up etc. These subsequently captured images allow correspondingly updated head pose and gaze determinations to be made, guiding further movements and image capture, and so on.

System 100 also includes a second plurality of drones 108 (three are shown in FIG. 1), each drone 106 being equipped with a drone camera 110 (just one is indicated for simplicity). Each of these drones 108 is positioned in proximity to the person, with camera orientations directed generally in outward or forward directions relative to the direction the person is facing, while avoiding positions directly in front of the person's face. The pose of each drone camera 108 is determined at least in part by the gaze determination received by that drone from the first plurality of drones, such that the drone cameras 108 of the second plurality of drones capture a second plurality of images of portions of the environment in front of the person, within or adjacent or overlapping the person's field of view. Post processing of the second plurality of images allows generation of a first-person view[1] representative of a view of the environment seen by the person. In some cases, the view may include portions of the environment that are not actually seen by the target, but could potentially be, as they lie only slightly outside the target's field of view, and may be useful to include for dramatic or informative purposes.

[1] View 406 in FIG. 4, described below, is an example of this.

The white "bucket-shaped" regions visible near the drones in FIG. 1 (and FIG. 4 discussed below) represent fields of view of those drones.

In many embodiments, rather than a single first-person view, the desired output of the system is a video stream of first-person views, representative of a continuum of views of the environment seen by the target while in motion through the environment over a time interval longer than the time taken to generate a single view. In these embodiments, the system is operated with the first and second pluralities of drones continuously tracking the target and capturing images as described above, such that the post processing generates a video sequence of first-person views, representative of that continuum of views.

In some embodiments, the target of interest, whose "first-person" view is to be reconstructed may not be a human individual, as depicted in FIG. 1, but an animal or other mobile subject with visual sensor or sensors detectable in the images captured by the first plurality of drones 102. The term "head" is used as a convenient term throughout this disclosure to mean a portion of the target having a surface referred to as a "face" in which one or more visually detectable, visual sensors are positioned. It should be appreciated that any target of interest for the purposes of this disclosure intrinsically has such a head and such a face.

The first plurality of drones 102, which provides head pose and gaze measurements, may be termed a "gaze positioning" swarm, while the second plurality of drones 104, which provides images of the environment in front of the target may be termed a "first-person view" swarm. In some embodiments, there may be more than one of either type of swarm or of both types, operating separately or in collaboration according to different applications.

An important feature of the present invention is differentiation between the two different types of drone swarm. This allows optimization of the drones and drone cameras according to their function. The primary function of the gaze positioning swarm is to capture images of sufficient quality to enable head position and gaze determinations. To achieve this, consumer-level, relatively light, small cameras may be adequate, but demands on drone maneuverability, including flying backwards, may be high. Safety, as the drones may be in the target's path, is a key control consideration for this swarm. The primary function of the first-person view swarm is to capture high quality, large field of view images of the environment beyond the target's head. This will typically require studio quality, relatively large and heavy cameras, and drone stability during flight and image capture is a key control consideration for this swarm.

In some embodiments, some or all of the drones in either plurality may carry more than one camera. It should be appreciated that the teachings detailed in this disclosure on system operation and image processing may readily be extended to cover such embodiments without departing from the spirit and scope of the present invention.

In some applications, any swarm may include a reference drone, characterized by a reference pose, which characterizes the pose of the whole swarm, so that one swarm's pose can be determined given the pose of another swarm, and the expected relative pose between the two swarms.

In some embodiments, system 100 includes a ground-based swarm controller 112, operable to exert at least partial control of poses (position and orientation) of drones in at least one of the swarms. The control may, in some cases, be exerted by the swarm controller sending to each of the drones of that swarm a corresponding drone-specific pose command. In other cases, the swarm controller may send a plurality of pose commands to a leader drone within that swarm, that leader drone responding by communicating, directly or indirectly, with each other drone of the swarm, such that each drone of the swarm receives a corresponding drone-specific pose command.

Drone-to-drone communication topology within a swarm may be of a star, tree, mesh or other pattern, according to the application.

Figure 3:
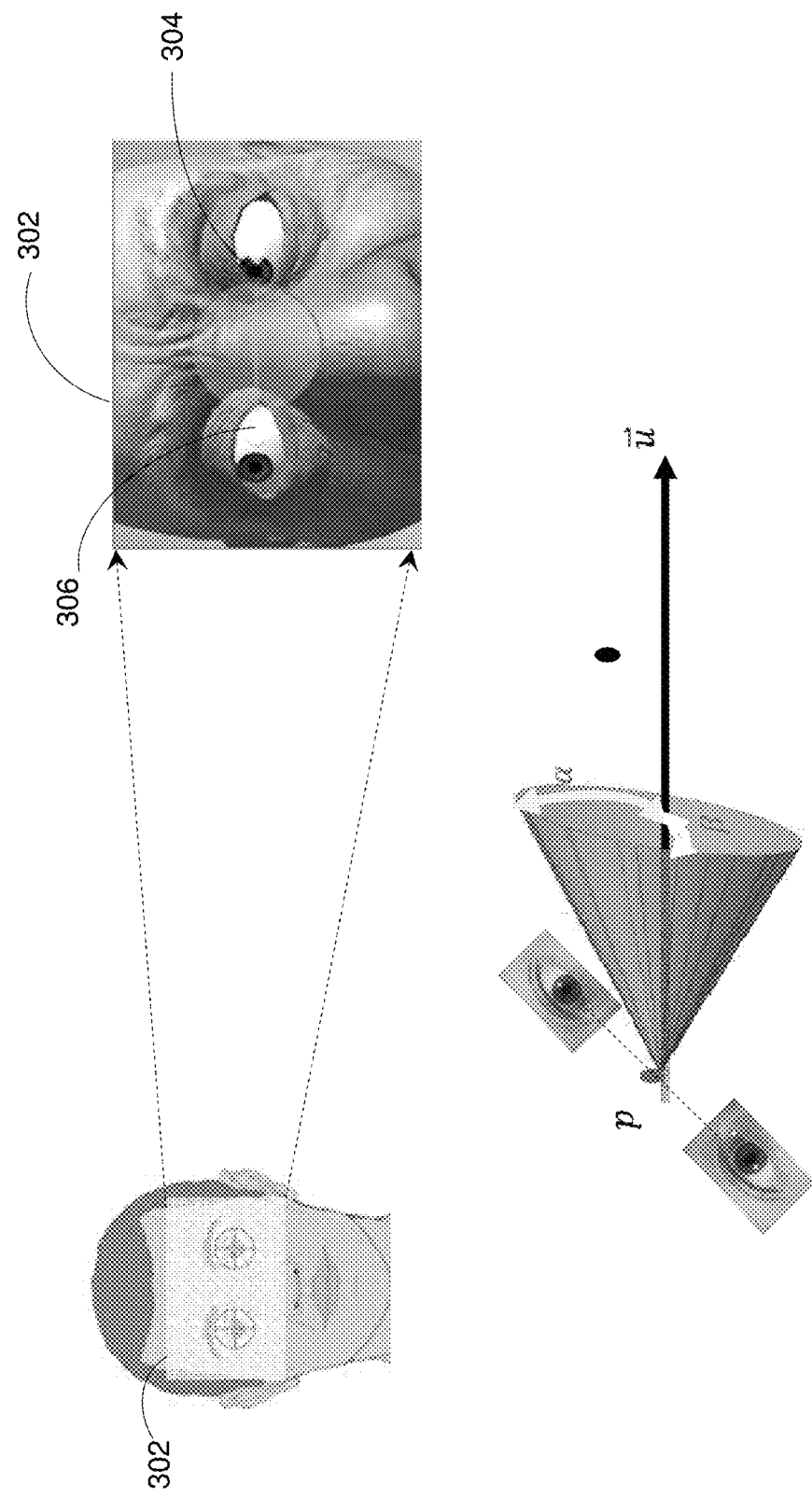
FIG. 3 illustrates process steps in gaze determination according to some embodiments.

FIG. 2 schematically depicts an arrangement for achieving gaze determination, and FIG. 3 schematically depicts stages of gaze determination according to some embodiments. The determination depends on images captured by the first plurality of drones 102, so the second plurality of drones 108 is omitted from FIG. 2, for simplicity. First, the view on the left of FIG. 2 indicates image capture by two drones at different positions and orientations. Face detection can be carried out by, for example, a state-of-the-art, DNN-based face detection method, trained to localize the face area (indicated by dashed oval A in FIG. 2) in images, and to estimate the degree of head rotation in each image. Next, eye detection can be carried out using any one of various well-known techniques that typically localize a pair of eyes (as described below) in each image, taking the estimated head rotation into account; and finally gaze detection may be determined, which may be defined in terms of the target's field of view (a 2D indication limited by lines B-B' is shown in the view on the right of FIG. 2) at the moment of image capture.

FIG. 3 shows examples of how eye detection and subsequent gaze determination may be achieved. First, (see upper two diagrams in the figure) a 2D eye "region of interest" 302 may be defined, and the irises 304 and whites 306 of the eyes may be identified within the region of interest. The difference in the center positions of irises and whites may be used in (for example) a DNN regression scheme to yield a 2D estimate of an eye rotation vector relevant to that single image. Next (see lower diagram in the figure) synchronized images from more than one camera in the swarm may be processed, applying a technique such as multi-view triangulation, which uses known camera poses to ultimately yield a 3D gaze determination, indicating the target's field of view (partly defined by vector u and angular spread $\beta$ in the diagram at bottom right of FIG. 3). One of skill in the art would appreciate that there are many other possible ways to achieve head pose and gaze determinations from images captured by the gaze positioning swarm of drones. One would involve the use of a trained end-to-end regressor, for example.

Figure 4:
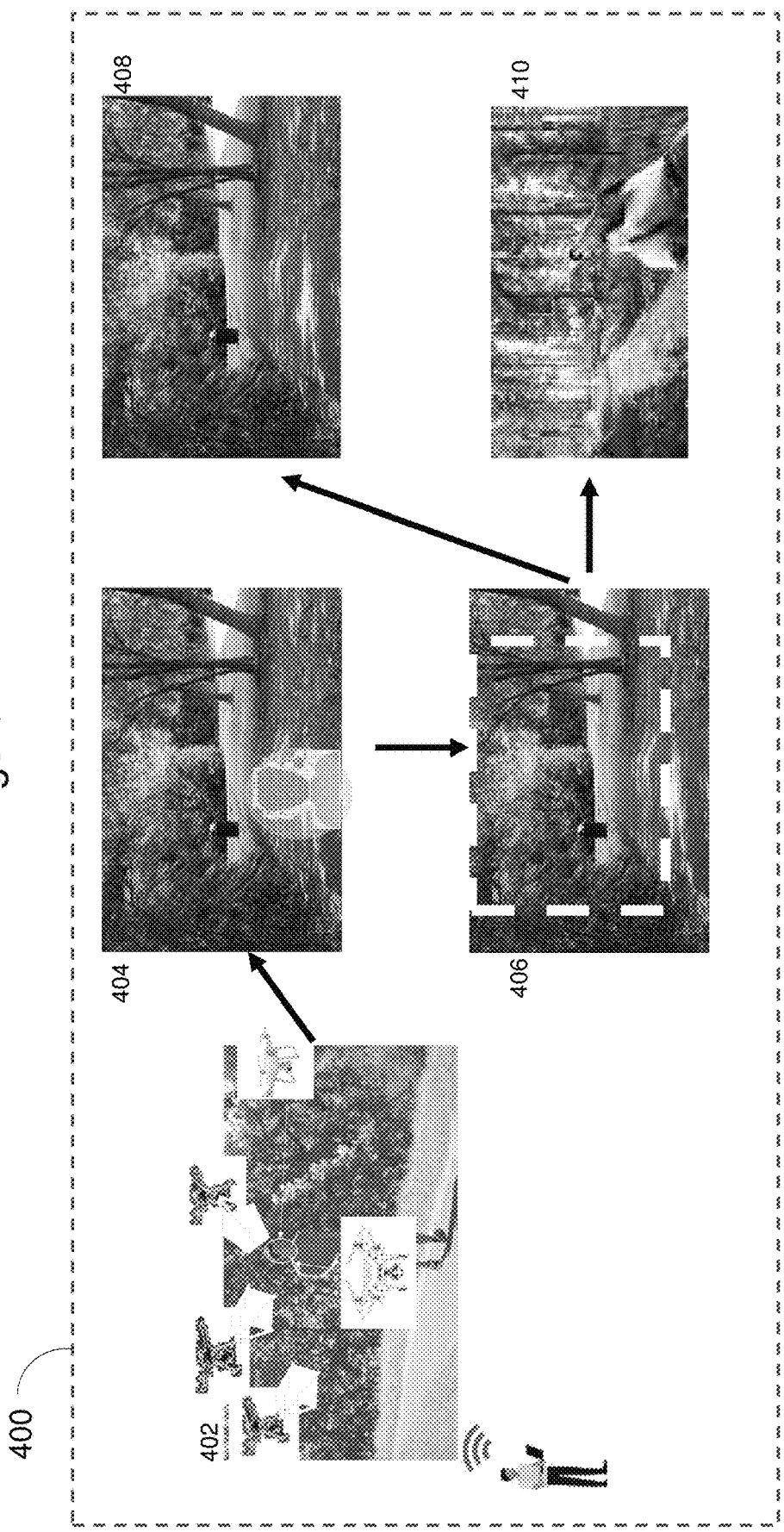
FIG. 4 schematically illustrates a method of operation according to some embodiments.

FIG. 4 schematically illustrates a method 400 of multi-view imaging according to some embodiments. The leftmost part of the figure shows a view 402 of elements of system 100, described above with regard to FIG. 1. As discussed above with regard to FIG. 1, pluralities of images are captured and processed by the gaze positioning swarm, and other pluralities of images are captured by the first-person view swarm, while the gaze positioning swarm, optionally in collaboration with the first person view swarm, tracks the target's movements. All this occurs during the filming stage of the method, which may occur in any required outdoor or indoor environment.

The next method stage is post-processing, which may occur at a studio or other convenient location, online or offline. Consider for simplicity the situation where a first plurality of images has been captured by the gaze positioning swarm, enabling suitable drone camera posing for the capture of a second plurality of images by the first-person view swarm. Well known image processing techniques may be applied to the second plurality of images to create a composite pseudo-3D image 404, clearly including the view seen by target 106, but also showing part of the target's upper body, as the drone cameras capturing the images must have been slightly behind and above the target, capturing views of the target in each image. Well known image processing techniques may be used to remove the target from image 404 to yield image 406, and then to crop that image as desired to more closely represent the view actually seen by the target, i.e. the desired first-person view 408. In general, a sequence of such views is generated from images captured over a significant period of time and action by the target, to provide a realistic immersive movie experience for the viewer. Images may be switched between "traditional" views showing the target (or actor) and first-person views of that target (or actor). An interactive experience may be provided to the viewer, offering the option of time-freezing for free view.

In some embodiments, rather than provide first-person views for movie applications, images such as that shown at 410 may be generated for game and content developers. For example, the collection of images 410, ordered in time and following a subject's trajectory, allow game designers to guide the player moving along the subject's route and showing the "real scene" in first-person-view. A content provider could also use the collection of images for other VR applications beyond game development or filming.

In some embodiments, the post processing stage of the method may include either one or both of automatic frame-to-frame gaze direction smoothing and automatic frame-by-frame FPV generation given the 3D gaze direction.

Figure 5:
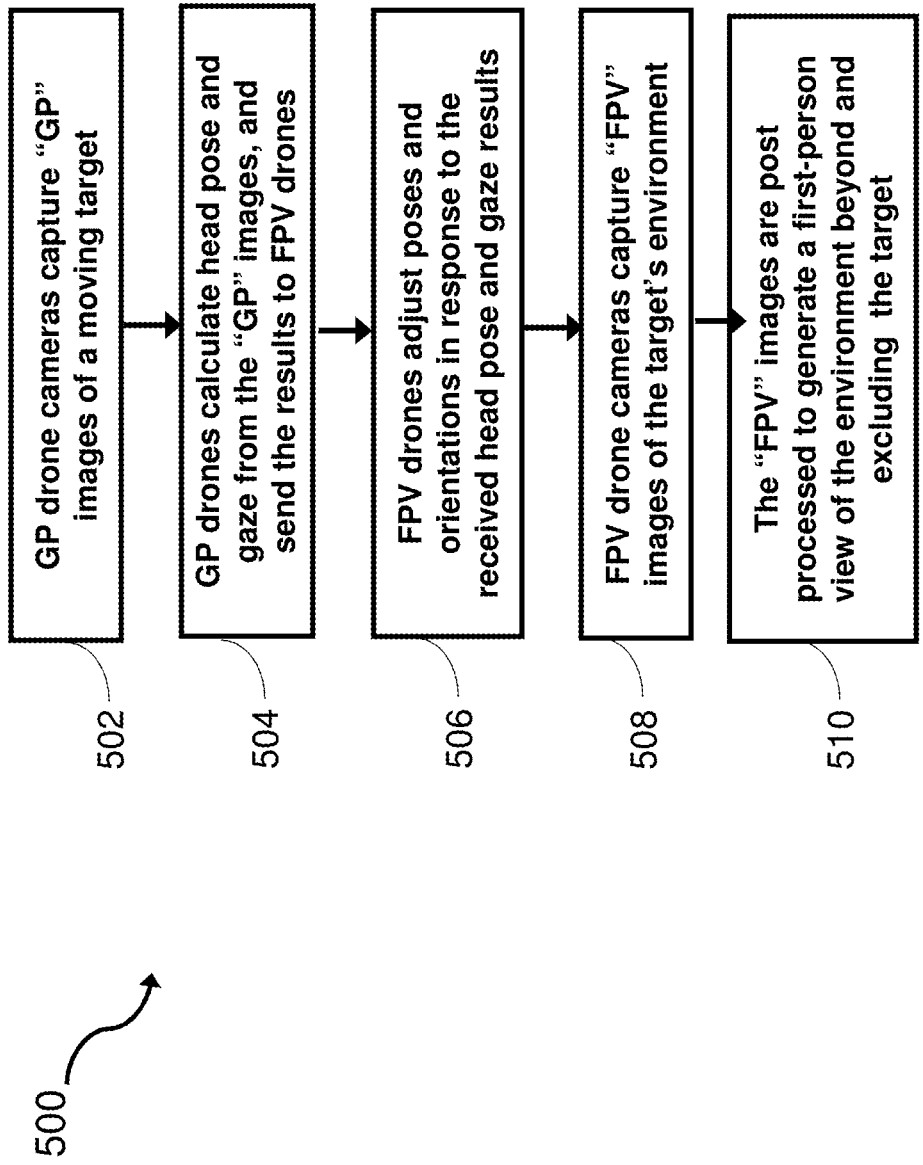
FIG. 5 is a flowchart of a method for multi-view imaging of an environment according to some embodiments.

FIG. 5 is a flowchart of a method 500 for multi-view imaging according to some embodiments. At step 502, a first plurality of gaze positioning (GP) drone cameras on GP drones capture a first plurality of images of a moving target. As discussed above, the cameras are positioned and oriented such that each image includes an eye region showing at least one complete eye in the target's face. At step 504, these images are analyzed to calculate the target's head pose and gaze, using techniques such as those described above, and the results of the calculations are transmitted to a second plurality of drones, the first-person view (FPV) drones. At step 506, the FPV drones adjust their poses (positions and orientations) as necessary in the light of the received data. At step 508, cameras on the FPV drones capture a plurality of images of the environment beyond the target. In general, at least some of these "FPV" images will include partial views of the target. At step 510, post-processing of the "FPV" images is carried out, to generate a composite first-person view of the environment using techniques as described above to "remove" the target.

While the flowchart in FIG. 5 illustrates essential steps to perform embodiments of the present invention, it should be appreciated that many other steps may be involved, differing slightly in different situations and applications, such as steps to initialize positions of the two swarms of drones before step 502, steps to readjust poses or change other image capture parameters in response to instructions from a movie director, with or without intervening instructions from a swarm controller, etc.

Method 500 illustrates a simple case, where only one set of images is captured by each swarm of drones, and a single first-person view is generated. In many embodiments of interest, of course, a time sequence involving a large number of sets of images will be involved, to generate a sequence of image frames for a "movie" experience rather than a single frame for a static one-shot view. It should be appreciated that the illustrated method may readily be extended to cover these cases, without departing from the spirit or scope of the invention.

Similarly, while the above descriptions have concerned the tracking of a single target, for that target's first-person views, it should be appreciated that the focus of systems and methods of the present invention could easily switch between different targets during the filming. One way of achieving this would be for a ground-based swarm controller to send target switching instructions to at least the gaze positioning swarm of drones as and when desired. Those drones would change their trajectories and focus as necessary, and communicate to the FPV drone swarm more or less as described above, so that subsequent images captured by the latter swarm would relate to views of the environment as seen by the second target.

Embodiments described herein provide various benefits in systems and methods for multi-view imaging. In particular, embodiments enable first-person view generation of environments as seen by a moving target without requiring detailed prior knowledge of the target's path of movement or action, and with minimal demands on the target, as no camera or associated hardware is either worn by or in contact with the target. Moreover, separating the operations of determining head pose and gaze from that of capturing high quality images of the environment enables optimizing drone and drone resources. The embodiments described above lend themselves to automated, real-time control of multiple cameras, in many cases making use of distributed control among the drones themselves. Computational demands during the filming process are modest, being limited to head pose and gaze determination without requiring scene analysis or object recognition, with processing of the images to be used to make up the final product being reserved for a post-processing stage.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A system of multi-view imaging of an environment through which a target moves, the system comprising:
   a first plurality of drones, each drone having a drone camera; and
   a second plurality of drones, each drone having a drone camera;
   wherein the first plurality of drones moves to track movement of the target, being positioned in front of the target such that a corresponding first plurality of images of the target's face is captured by drone cameras of the first plurality of drones;
   wherein the target is characterized by a time-variable head pose and a time-variable gaze;
   wherein the first plurality of drones:
      makes real time determinations of the target's head pose and gaze, based on the first plurality of captured images and on spatial relationships between poses of the first plurality of drone cameras; and
      transmits the head pose and gaze determinations to the second plurality of drones;
   wherein the second plurality of drones moves to track movement of the target, being positioned in proximity to the target, with drone camera poses determined at least in part by the head pose and gaze determinations received from the first plurality of drones, such that the drone cameras of the second plurality of drones capture a second plurality of images of portions of the environment in front of the target; and
   wherein post processing of the second plurality of images allows generation of a first-person view representative of a view of the environment seen by the target at a time corresponding to the capture of the first plurality of images.

2. The system of claim 1,
   wherein poses of the first plurality of drone cameras are adjusted according to the head pose and gaze determinations, such that:
      a third plurality of images of the target's face is captured by cameras of the first plurality of drones; and
      the first plurality of drones makes revised real time determinations of the target's head pose and gaze, based on the third plurality of captured images and on spatial relationships between the adjusted poses of the first plurality of drone cameras, and transmit the revised real time determinations to the second plurality of drones;

wherein the second plurality of drones moves to continue tracking movement of the target, revising poses of drone cameras of the second plurality of drones determined, at least in part, by the revised real time head pose and gaze determinations received from the first plurality of drones, such that the drone cameras of the second plurality of drones capture a fourth plurality of images of portions of the environment in front of the target; and wherein post processing of the fourth plurality of images allows generation of a first-person view representative of a view of the environment seen by the target at a time corresponding to the capture of the third plurality of images.

3. The system of claim 1,
wherein the first and second pluralities of drones include first and second reference drones respectively, characterized by first and second reference poses; and
wherein the first and second reference poses characterize first and second swarm poses respectively for the first and second pluralities of drones.

4. The system of claim 1, wherein, within at least one of the first and second pluralities of drones, poses of all the drones are determined at least in part by a ground-based swarm controller.

5. The system of claim 4, wherein, for at least one of the first and second pluralities of drones, the ground-based swarm controller sends to each of the drones of that plurality a corresponding drone-specific pose command.

6. The system of claim 4, wherein, for at least one of the first and second pluralities of drones, the ground-based swarm controller sends a plurality of pose commands to a leader drone within that plurality, that leader drone responding by communicating, directly or indirectly, with each other drone of the plurality, such that each drone of the plurality receives a corresponding drone-specific pose command.

7. The system of claim 1, wherein determination of head pose and gaze by the first plurality of drones comprises:
processing each captured image in the first plurality of images to achieve face detection and eye detection; and
processing a combination of captured images in the first plurality of images to achieve head pose and gaze determination.

8. The system of claim 1, wherein the field of view of at least one of the drone cameras of the second plurality of drones, allowing image capture in the second plurality of images of portions of the environment in front of the target, is greater than an anticipated field of view of the target.

9. The system of claim 1, wherein the post processing comprises:
automatic frame to frame gaze direction smoothing to determine an estimated 3D gaze direction; and
automatic frame to frame first-person view generation based on the estimated 3D gaze direction.

10. The system of claim 1, wherein within at least one of the first and second pluralities of drones, each drone camera is attached to or positioned within a corresponding drone such that a pose characterizing that drone fully determines a pose of the drone camera.

11. The system of claim 1,
wherein characteristics of the first plurality of drones include small size, low weight, and high maneuverability;
wherein characteristics of the second plurality of drones include stability of controlled motion; and
wherein characteristics of the drone cameras within the second plurality of drones include high image quality over large fields of view.

12. A method for multi-view imaging of an environment through which a target moves, the method comprising:
operating a first plurality of drone cameras on a first plurality of drones to capture a first plurality of images of the target, the drones moving to track movement of the target while being positioned in front of the target such that the first plurality of images includes images of the target's face, wherein the target is characterized by a time-variable head pose and a time-variable gaze;
making real time determinations of the target's head pose and gaze, based on the first plurality of captured images and on spatial relationships between poses of the first plurality of drone cameras;
transmitting the head pose and gaze determinations from the first plurality of drones to a second plurality of drones positioned in proximity to the target, each drone having a drone camera;
adjusting poses of the second plurality of drones to respond to the transmitted head pose and gaze determination as necessary to track target movement;
adjusting poses of drone cameras on the second plurality of drones and operating the drone cameras of the second plurality of drones to capture a second plurality of images of portions of the environment in front of the target; and
post-processing the second plurality of images to generate a first-person view representative of a view of the environment seen by the target at a time corresponding to the capture of the first plurality of images.

13. The method of claim 12, additionally comprising:
after determinations of head pose and gaze are made by the first plurality of drones, adjusting poses of the first plurality of drones and drone cameras according to the determinations, and operating the first plurality of drone cameras such that:
a third plurality of images of the target's face is captured by the first plurality of drone cameras;
revised real time determinations of the target's head pose and gaze, based on the third plurality of captured images and on spatial relationships between adjusted poses of the first plurality of drone cameras, are made by the first plurality of drones; and
the revised real time head pose and gaze determinations are transmitted to the second plurality of drones;
wherein the second plurality of drones moves to continue tracking movement of the target, revising poses of drone cameras of the second plurality of drones according, at least in part, to the revised real time head pose and gaze determinations received from the first plurality of drones, such that the drone cameras of the second plurality of drones capture a fourth plurality of images of portions of the environment in front of the target; and
wherein post processing of the fourth plurality of images allows generation of a first-person view representative of a view of the environment seen by the target at a time corresponding to the capture of the third plurality of images.

14. The method of claim 12, wherein, within at least one of the first and second pluralities of drones, poses of all the drones are determined at least in part by a ground-based swarm controller.

15. The method of claim 14, wherein, for at least one of the first and second pluralities of drones, the ground-based swarm controller sends to each drone of that plurality a corresponding drone-specific pose command.

16. The method of claim 14, wherein, for at least one of the first and second pluralities of drones, the ground-based swarm controller sends a plurality of pose commands to a leader drone within that plurality, that leader drone responding by communicating, directly or indirectly, with each other drone of the plurality, such that each drone of the plurality receives a corresponding drone-specific pose command.

17. The method of claim 12, wherein determination of head pose and gaze by the first plurality of drones comprises:
  processing each captured image in the first plurality of images to achieve face detection and eye detection; and
  processing a combination of captured images in the first plurality of images to achieve head pose and gaze determination.

18. The method of claim 12, wherein the post processing comprises:
  automatic frame to frame gaze direction smoothing to determine an estimated 3D gaze direction; and
  automatic frame to frame first-person view generation based on the estimated 3D gaze direction.

19. The method of claim 12, wherein within at least one of the first and second pluralities of drones, each drone camera is attached to or positioned within a corresponding drone such that a pose characterizing that drone fully determines a pose of the drone camera.

20. The method of claim 12,
  wherein characteristics of the first plurality of drones include small size, low weight, and high maneuverability;
  wherein characteristics of the second plurality of drones include stability of controlled motion; and
  wherein characteristics of the drone cameras within the second plurality of drones include high image quality over large fields of view.

* * * * *